US009496756B2

(12) United States Patent
Stout

(10) Patent No.: US 9,496,756 B2
(45) Date of Patent: Nov. 15, 2016

(54) METHODS OF ASSEMBLING STATORS FOR USE IN ELECTRICAL MACHINES

(71) Applicant: Regal Beloit America, Inc., Beloit, WI (US)

(72) Inventor: Bryan J. Stout, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 280 days.

(21) Appl. No.: 13/652,904

(22) Filed: Oct. 16, 2012

(65) Prior Publication Data
US 2014/0103776 A1    Apr. 17, 2014

(51) Int. Cl.
*H02K 15/02* (2006.01)
*H02K 1/12* (2006.01)

(52) U.S. Cl.
CPC ............. *H02K 1/12* (2013.01); *H02K 15/02* (2013.01)

(58) Field of Classification Search
CPC .............................. H02K 1/16; H02K 15/024
USPC ............ 29/596–598, 732, 739; 310/216.001, 310/216.119, 216.129, 89
See application file for complete search history.

(56) References Cited

U.S. PATENT DOCUMENTS

| | | | | |
|---|---|---|---|---|
| 3,463,955 A * | 8/1969 | Scardina et al. | ........ | 310/216.119 |
| 4,007,867 A * | 2/1977 | Wielt et al. | ................ | 228/179.1 |
| 4,603,273 A | 7/1986 | McDonald | | |
| 5,398,397 A * | 3/1995 | Johnson | ............... | H02K 15/024 |
| | | | | 180/65.6 |
| 5,534,736 A | 7/1996 | Johnson | | |
| 5,852,338 A * | 12/1998 | Boyd et al. | ...................... | 310/89 |
| 6,046,432 A | 4/2000 | Addison et al. | | |
| 6,321,439 B1 * | 11/2001 | Berrong et al. | ................ | 29/596 |
| 6,462,457 B2 * | 10/2002 | Shah et al. | ............. | 310/216.001 |
| 7,653,986 B2 * | 2/2010 | Majernik et al. | ............... | 29/732 |
| 8,533,933 B2 * | 9/2013 | Verrier | ........................... | 29/596 |
| 2002/0074894 A1* | 6/2002 | Fuller | .......................... | 310/258 |
| 2005/0235480 A1* | 10/2005 | Majernik et al. | ............... | 29/596 |
| 2014/0103776 A1* | 4/2014 | Stout | ..................... | 310/216.129 |

* cited by examiner

*Primary Examiner* — Minh Trinh
(74) *Attorney, Agent, or Firm* — Armstrong Teasdale LLP

(57) ABSTRACT

A method of assembling an electrical machine having an axis of rotation is provided. The method includes aligning a plurality of laminations that each includes a slot and coupling a plurality of keys to the plurality of laminations. The method also includes moving the plurality of keys from a first position to a second position to facilitate coupling together the plurality of laminations, and indexing the plurality of keys to facilitate forming at least one planar surface that is positioned orthogonal to the axis of rotation.

11 Claims, 6 Drawing Sheets

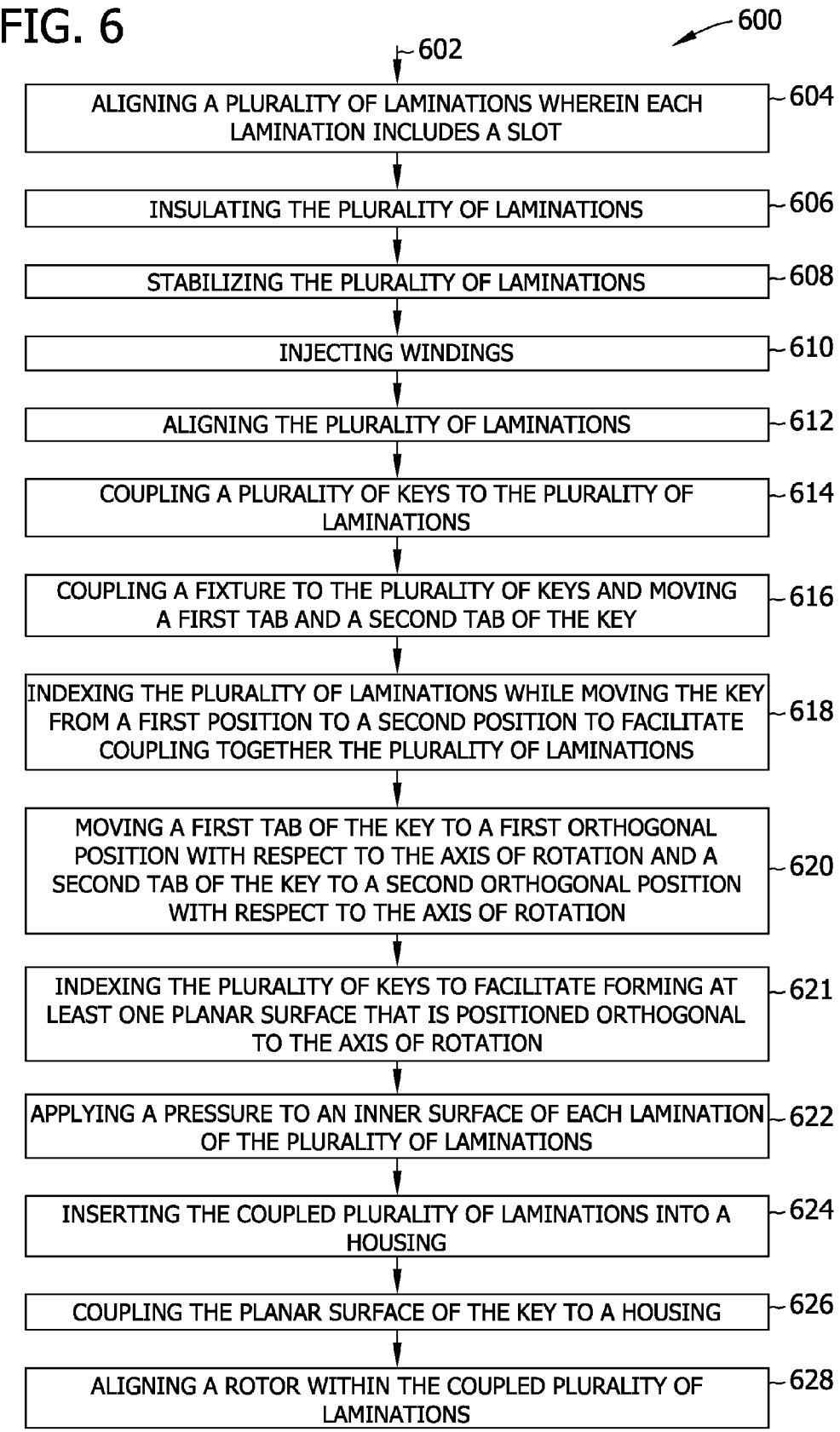

METHODS OF ASSEMBLING STATORS FOR USE IN ELECTRICAL MACHINES

BACKGROUND OF THE INVENTION

The embodiments described herein relate generally to electrical machines, and more particularly, to methods and systems for assembling stators of the electrical machines.

Certain electrical machines are sometimes referred to as brushless motors. Brushless motors include both brushless AC motors and brushless DC motors and are used in a wide variety of systems operating in a wide variety of industries. Motors commonly include a stator having a plurality of stacked laminations and a central bore for receiving a rotor and associated bearings. A pair of end frames or end bells can be coupled to opposite ends of the stator to facilitate supporting the rotor. Proper radial and axial alignment between the motor components is desired to facilitate providing free rotation of the rotor, preventing excessive eccentricity in an annular air gap between the rotor and the stator and preventing excessive axial rotor thrust.

Typically, the stator laminations are formed with longitudinal slots on the periphery of each lamination. In some manufacturing processes, a relatively large number of laminations may be stacked on a welding arbor to a desired height. Conventionally, the welding arbor can be configured to radially expand against the inner circumference of the stack such that the individual laminations will be concentrically aligned around the axis of rotation. A welding device may be utilized to produce welds at predetermined locations within the slots. As a result, the laminations will be connected together into a core body that can be handled as a unit.

An extended cleat may be inserted radially into each slot and over the welds such that the cleat may extend longitudinally beyond each end of the stator. After installation of the cleat, the stator may be insulated. After insulation of the stator, windings can be injected into the stator and coupled to each other. The stator may also be coated and saturated with a bonding varnish.

Since the cleats may extend longitudinally beyond the stator ends, the cleats may present a cutting hazard to workers further handling the stator. Accordingly some processes may further cut off the cleat ends after varnishing the stator. Cutting off the cleat ends, however, may form uneven surfaces on the stator ends such that the stator end faces may not be perpendicular to the bore. Accordingly, the stator end faces may present uneven mounting surfaces for the component that houses the rotor and bearings which may result in interference and/or misalignment of the rotor.

BRIEF DESCRIPTION OF THE INVENTION

In one aspect, a stator is provided. The stator includes a plurality of laminations having a first lamination, a second lamination and a plurality of intermediate laminations located between the first lamination and the second lamination. The stator includes a plurality of windings coupled to the plurality of laminations and a plurality of keys coupled to the plurality of laminations. Each key includes a first tab coupled to the first lamination; a second tab coupled to the second lamination; and a portion located between the first and second tabs and coupled to the intermediate laminations wherein said first tab is configured to move from a first position that is coplanar to said portion to a second position that is orthogonal to the axis of rotation.

In another aspect, an electrical machine is provided. The electrical machine includes a housing having a mounting surface. The electrical machine further includes a stator having a plurality of laminations which includes a first lamination, a second lamination and intermediate laminations located between the first lamination and the second lamination. The stator further includes a plurality of keys coupled to the plurality of laminations. Each key includes a first tab coupled to the first lamination and configured to move from a first position that is coplanar to said portion to a second position that is orthogonal to said axis of rotation; a second tab coupled to the second lamination and configured to move from a first position that is coplanar to said portion to a second position that is orthogonal to said axis of rotation; and a portion located between the first and second tabs and coupled to the intermediate laminations. Further, the stator includes a rotor coupled to the stator.

In yet another aspect, a method of assembling an electrical machine is provided. The method includes aligning a plurality of laminations wherein each lamination includes a slot. The method also includes indexing the plurality of laminations and coupling a plurality of keys to the plurality of laminations. The method further includes moving the plurality of keys from a first position to a second position to facilitate coupling together the plurality of laminations indexing the plurality of keys to facilitate forming at least one planar surface that is positioned orthogonal to the axis of rotation.

BRIEF DESCRIPTION OF THE DRAWINGS

FIG. 6 illustrates an exemplary flowchart illustrating a method of assembling a stator.

DETAILED DESCRIPTION OF THE INVENTION

The embodiments described herein relate to electrical machines and methods of assembling the electrical machines. More particularly, the embodiments relate to a stator that is configured to facilitate inserting components into the electrical machine. More particularly, the embodiments relate to a stator that is configured to facilitate aligning a rotor and bearings within the electrical machine. It should be understood that the embodiments described herein for electrical machines are not limited to motors, and should be further understood that the descriptions and figures that utilize a motor are exemplary only. Moreover, while the embodiments illustrate a three phase electric motor, the embodiments described herein may be included within motors having any number of phases, including single phase and multiple phase electric motors.

Figure 1:
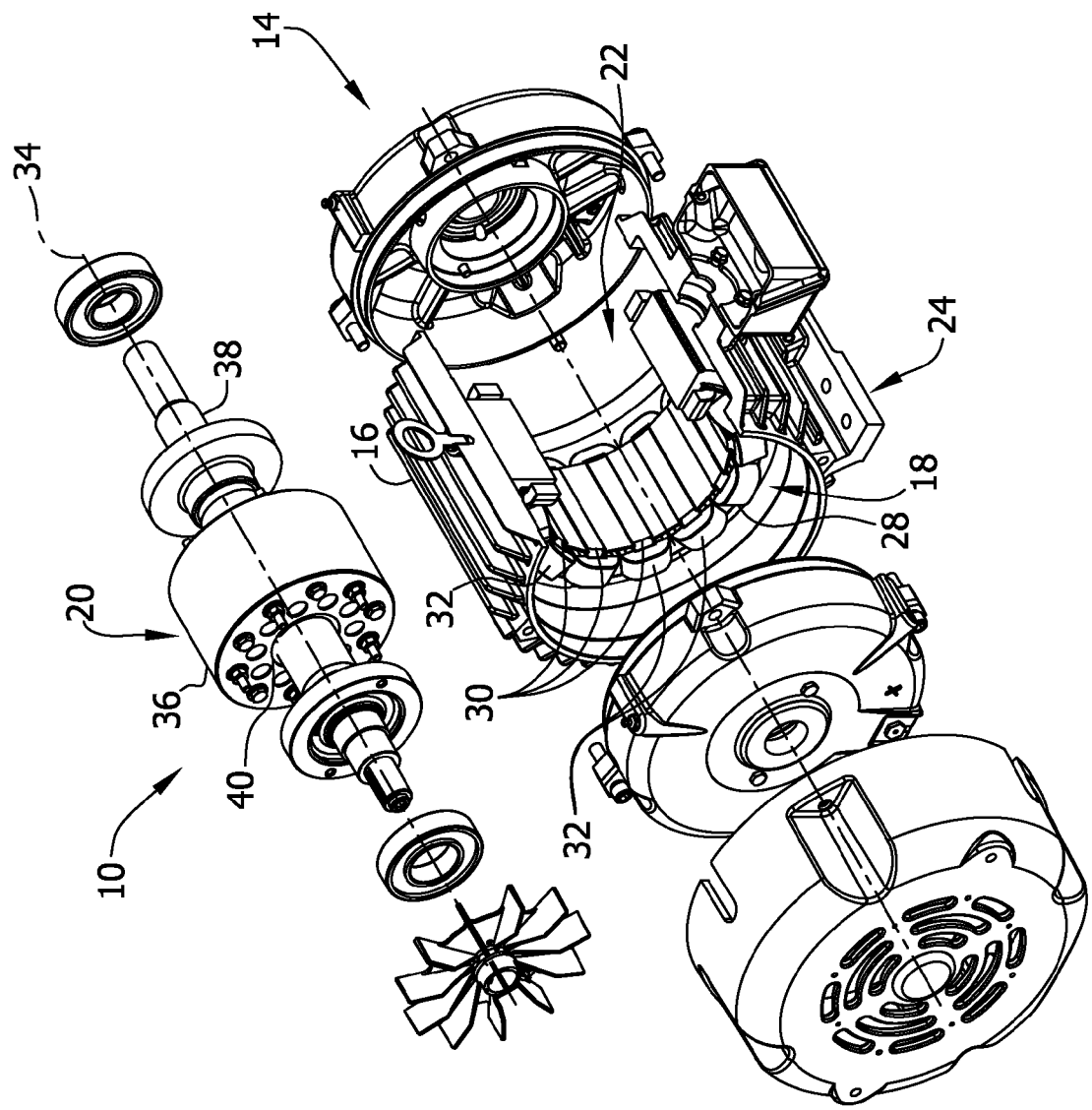
FIG. 1 is an exploded cutaway view of an exemplary electric motor.

FIG. 1 is an exploded cutaway view of an exemplary electrical machine 10 that can be operated as either a generator or a motor. Electric motor 10 includes a first end 12 and a second end 14. Electric motor 10 further includes a motor assembly housing 16, a stationary assembly 18, and a rotatable assembly 20. Motor assembly housing 16 defines an interior 22 and an exterior 24 of motor 10 and is configured to at least partially enclose and protect stationary assembly 18 and rotatable assembly 20. Stationary assembly 18 includes a stator 28, which includes a plurality of stator teeth 30 and a plurality of windings 32 wound around stator teeth 30 and adapted to be electronically energized to generate an electromagnetic field. In the exemplary embodiment, a variable frequency drive (not shown) provides a signal, for example, a pulse width modulated (PWM) signal, to electric motor 10. In an alternative embodiment, electric motor 10 may include a controller (not shown) coupled to windings 32 and configured to apply a voltage to one or more of windings 32 at a time for commutating windings 32 in a preselected sequence to rotate rotatable assembly 20 about an axis of rotation 34.

In an exemplary embodiment, stationary assembly 18 is a three phase concentrated wound stator assembly and stator 28 is formed from a stack of laminations (not shown) made of a magnetically permeable material. While stationary assembly 18 is illustrated for purposes of disclosure, it is contemplated that other stationary assemblies of various other constructions having different shapes and with different numbers of teeth may be utilized. Rotatable assembly 20 includes a permanent magnet rotor core 36 and a shaft 38. Rotatable assembly 20 may also be referred to as an interior permanent magnet rotor. Examples of motors 10 that may include interior permanent magnet rotors include, but are not limited to, electronically commutated motors (ECMs). ECMs may include, but are not limited to, brushless direct current (BLDC) motors, brushless alternating current (BLAC) motors, and synchronous reluctance motors.

In the exemplary embodiment, rotor core 36 is formed from a stack of laminations (not shown) made of a magnetically permeable material and is substantially received in a central bore of stator 28. Rotor core 36 includes a shaft opening 42 having a diameter corresponding to a diameter of shaft 38. Rotor core 36 and shaft 38 are concentric and configured to rotate about axis of rotation 34. Rotor core 36 and stator 28 are illustrated as being solid in FIG. 1 for simplicity, their construction being well known to those of ordinary skill in the art. For example, rotor core 36 may be formed using a sintering process from a soft magnetic composite (SMC) material, a soft magnetic alloy (SMA) material, and/or a powdered ferrite material.

Windings 32 are commutated without brushes by sensing the rotational position of rotatable assembly 20 as it rotates within stator 28 and utilizing electrical signals generated as a function of the rotational position of rotatable assembly 20 sequentially to apply a voltage to each of windings 32 in different preselected orders or sequences that determine the direction of the rotation of rotatable assembly 20. Position sensing may be accomplished by a position-detecting circuit (not shown) responsive to the back electromotive force (EMF) to provide a simulated signal indicative of the rotational position of rotatable assembly 20 to control the timed sequential application of voltage to windings 32 of stationary assembly 18. Other means of position sensing may also be used.

Figure 2:
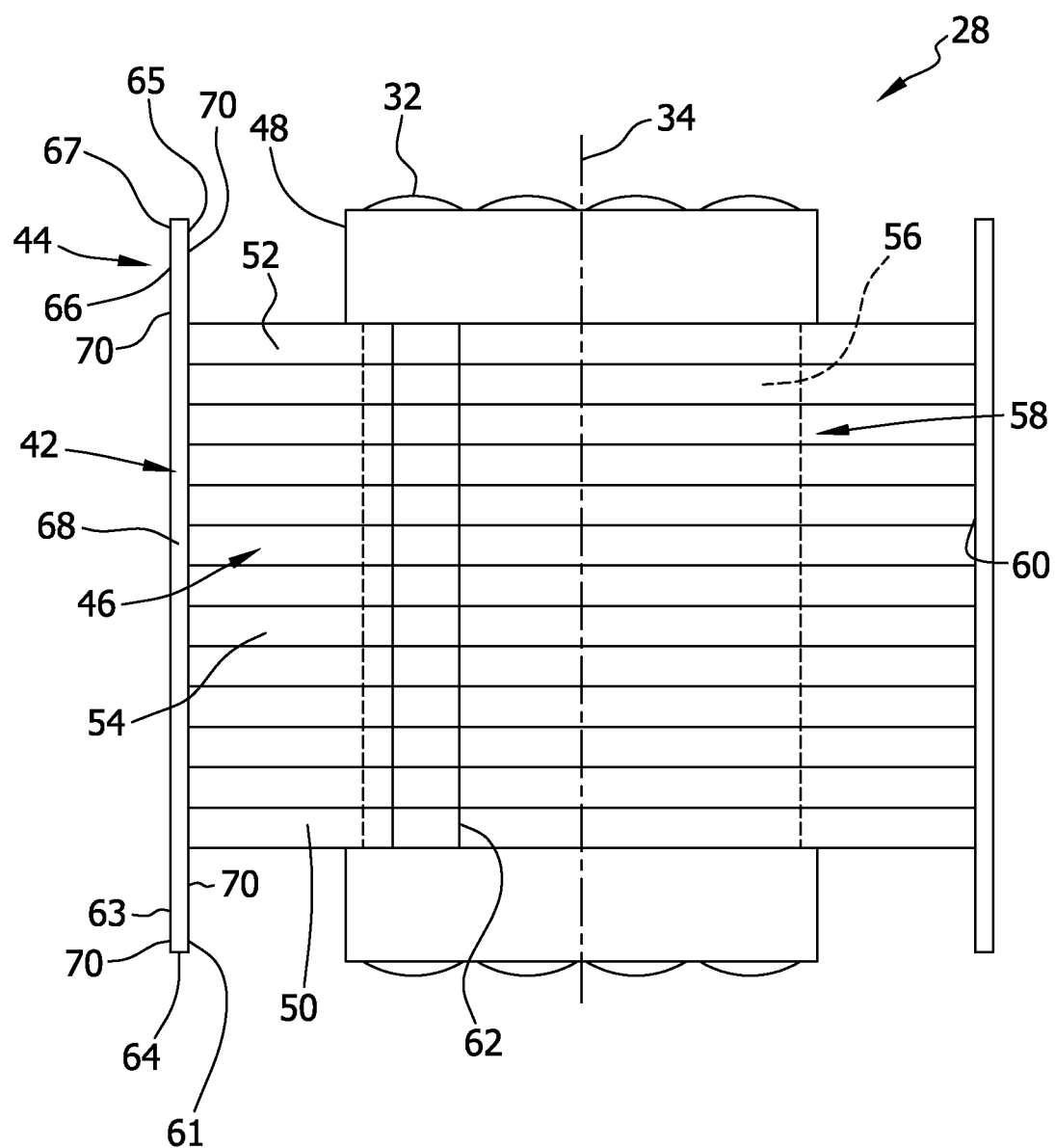
FIG. 2 is a cross sectional view of an exemplary stator of the electric motor shown in FIG. 1 illustrating a key of the stator in a first position.

FIG. 2 is a cross sectional view of stator 28 of electric motor 10 shown in FIG. 1 illustrating a plurality of keys 42 of stator 28 in a first position 44. In the exemplary embodiment, stator 28 includes a plurality of laminations 46, an insulation 48 coupled to laminations 46 wherein windings 32 are coupled to insulation 48. Key 42 is configured to couple to laminations 46 to facilitate aligning laminations 46 and orientating stator 28 within housing 16 (shown in FIG. 1). In the exemplary embodiment, the plurality of keys 42 includes at least three keys 42. Alternatively, the plurality of keys 42 can include three keys 42 and less than three keys 42.

In the exemplary embodiment, laminations 46 include a first lamination 50, a second lamination 52 and intermediate laminations 54 located between first and second laminations 50, 52. Each lamination 46 includes an inner surface 56 and an outer surface 58. Inner surface 56 defines a plurality of spaced slots (not shown) defining there between teeth 30 (shown in FIG. 1), wherein insulation 48 is configured to be inserted within slots 60. Outer surface 58 includes a plurality of slots 60 that are configured to couple to key 42. Moreover, outer surface 58 includes a plurality of notches 62 which are configured to facilitate aligning laminations 46 during stacking of laminations 46 and matching the contours of inner surfaces 56 and outer surfaces 58 of individual laminations 46.

Each key 42 includes a first tab 64, a second tab 66 and a portion 68 extending between first and second tabs 64, 66. First tab 64 includes an inner side 61 and an outer side 63 and second tab 66 includes an inner side 65 and an outer side 67. Sides 61, 63, 65 and 67 are configured to include substantially smooth surfaces 70 which are configured to orientate stator 28 within housing 16 as described herein. Moreover, portion 68 is configured to couple to intermediate laminations 54. More particularly, portion 68 is configured to insert within each slot 60 and couple to intermediate laminations 54. In first position 44, first tab 64 and second tab 66 are coplanar with portion 68 and parallel to axis of rotation 34. More particularly, first tab 64 is configured to extend away from portion 68 and beyond first lamination 50. Moreover, in first position 44, second tab 66 is configured to extend away from portion 68 and beyond second lamination 52.

Figure 3:
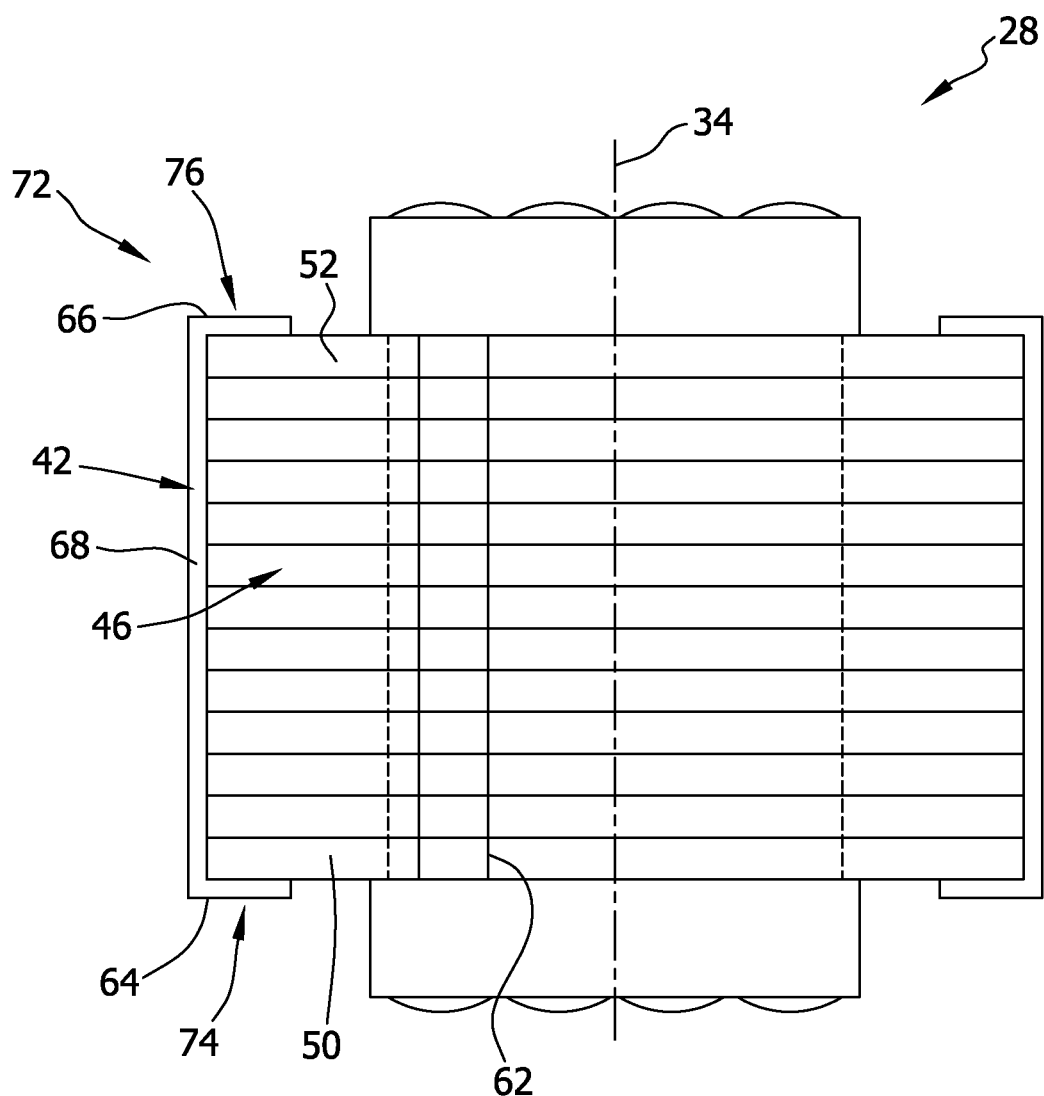
FIG. 3 is a cross sectional view of the exemplary stator and illustrating the key shown in FIG. 2 in a second position.

FIG. 3 is a cross sectional view of keys 42 shown in FIG. 2 in a second position 72. In the exemplary embodiment, first and second tabs 64, 66 are configured to move from first position 44 (shown in FIG. 2) to second position 72. In second position 72, first tab 64 is coupled to first lamination 50 and second tab 66 is coupled to second lamination 52. First tab 64 and second tab 66 are configured to facilitate aligning and coupling laminations 46 to one another. In second position 72, first and second tabs 64, 66 are positioned substantially orthogonal to portion 68. More particularly, first tab 64 is configured in a first orthogonal position 74 which facilitates positioning first tab 64 substantially perpendicular to portion 68 and axis of rotation 34. Moreover, second tab 66 is configured in a second orthogonal position 76 which facilitates positioning second tab 66 substantially perpendicular to portion 68 and axis of rotation 34. In second position 72, first tab 64 is substantially parallel to second tab 66. Moreover, in second position 72, first tabs 64 of the plurality of keys 42 are co-planar with one another. Further, in second position 72, planar surfaces 70 of first tabs 64 are orthogonal to axis of rotation 34. Alternatively, first and second tabs 64, 66 can be orientated at any angle with respect to portion 68 and/or axis of rotation 34 to enable key 42 to function as described herein.

Figure 4:
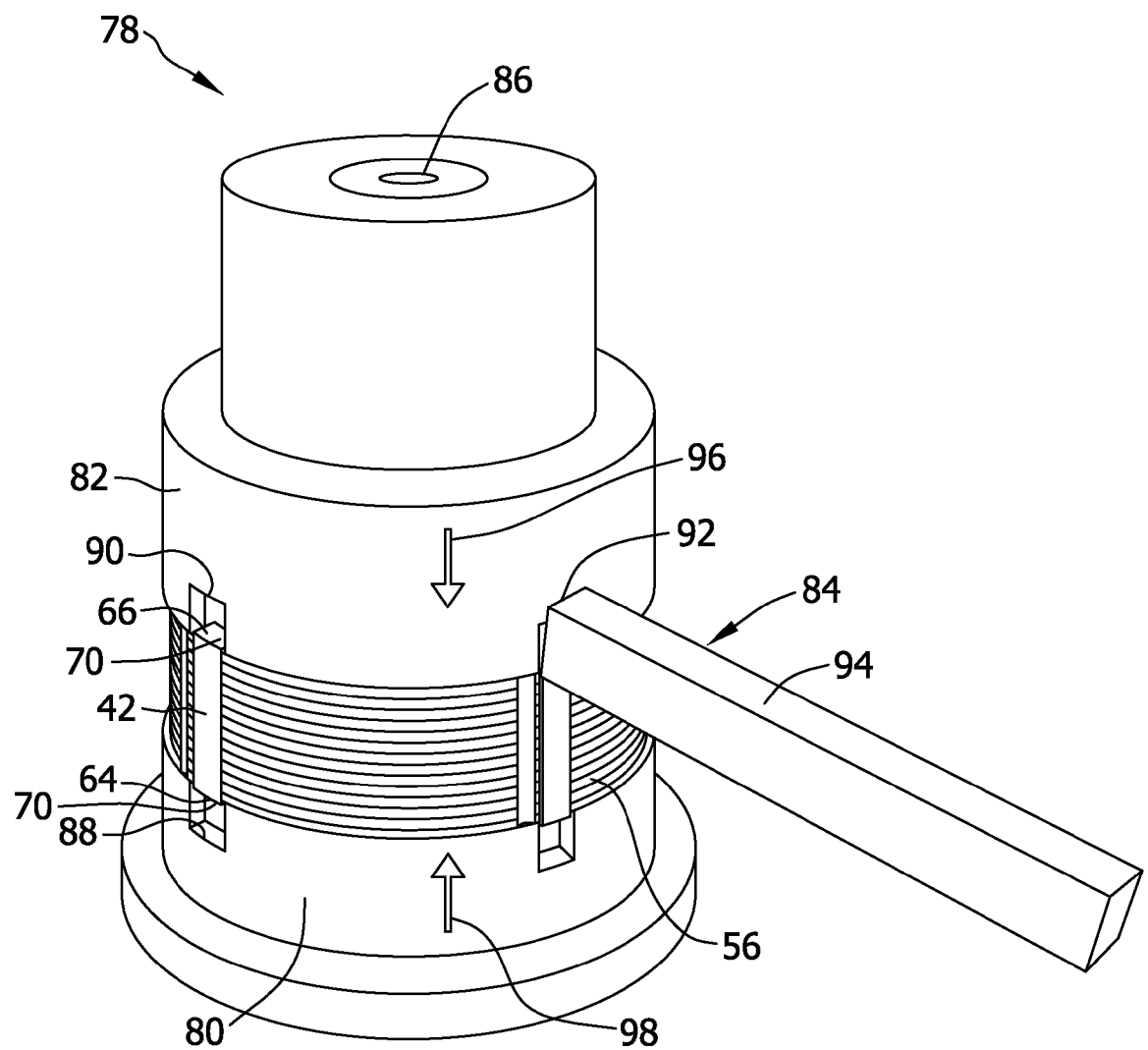
FIG. 4 is a perspective view of an exemplary fixture configured to facilitate assembling the stator shown in FIG. 3.

FIG. 4 is a perspective view of an exemplary fixture 78 configured to facilitate assembling stator 28 (shown in FIG. 3). Fixture 78 is configured to move first tab 64 and second tab 66 from first position 44 (shown in FIG. 2) to second position 72 (shown in FIG. 3). Fixture 78 includes a first member 80, a second member 82 and a press member 84. Fixture 78 further includes an arbor 86 coupled to first member 80. In the exemplary embodiment, first member 80 includes an inner channel (not shown) that is configured to couple to at least first lamination 50 (shown in FIG. 2). Moreover, first member 80 includes a slot 88 that is configured to couple to first tab 64 in first position 44. Second member 82 includes an inner channel (not shown) that is configured to couple to at least second lamination 52 (shown in FIG. 2). Moreover, second member 82 includes a slot 90 that is configured to couple to second tab 66 in first position 44.

Press member 84 includes a ram 92 and an arm 94 coupled to ram 92, such that ram 92 is configured to couple to second tab 66. Arm 94 is configured to move ram 92 to facilitate applying pressure to key 42. More particularly, ram 92 is configured to apply a pressure 96 to second tab 66 and first member 80 is configured to apply resistive pressure 98 to first tab 64. Slot 90 is configured to move second tab 66 from first position 44 to second position 72 and slot 88 is configured to move first tab 64 from first position 44 to second position 72. Moreover, in the exemplary embodiment, arbor 86 is configured to couple to inner surfaces 56 (shown in FIG. 2) of laminations 46 (shown in FIG. 2) such that arbor 86 is configured to radially expand inner surfaces 56 to align the plurality of laminations 46. More particularly, arbor 86 is configured to facilitate pressuring inner surfaces 56. In the exemplary embodiment, arbor 86 is configured to concentrically align laminations 46 and square-up inner surfaces 56 with respect to first tab 64 and second tab 66. In the exemplary embodiment, fixture 78 is configured to release pressures 96 and 98 and key 42 and the plurality of laminations 56 are configured to rotate with respect to fixture 78. Moreover, fixture 78 is configured to apply at least one of pressures 96 and 98 to first and second tabs 64 and 66 to facilitate forming planar surfaces 70. Alternatively, fixture 78 can be rotated with respect to key 42 to re-apply at least one of pressures 96 and 98 to facilitate forming planar surfaces 70.

Figure 5:
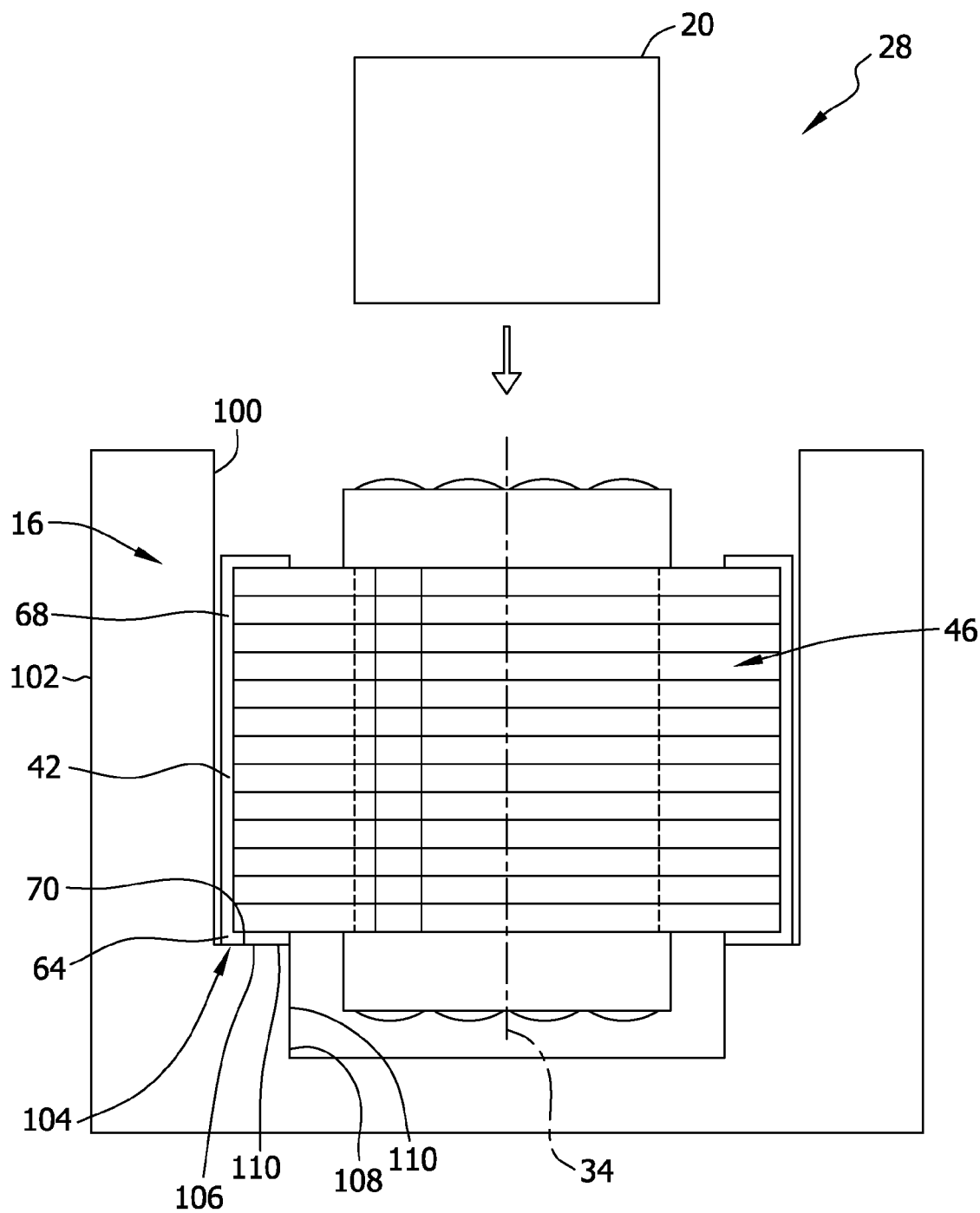
FIG. 5 is a cross sectional view of the exemplary stator shown in FIG. 3 coupled to a housing of the electric motor shown in FIG. 1.

FIG. 5 is a cross sectional view of stator 28 coupled to housing 16. In the exemplary embodiment, housing 16 includes an inner surface 100 and outer surface 102. Moreover, inner surface 100 includes a mounting surface 104 that is configured to concentrically align around axis of rotation 34. More particularly, mounting surface 104 includes a first side 106 and a second side 108 wherein first side 106 is configured orthogonal to axis of rotation 34 and second side 108 is configured parallel to axis of rotation 34. In the exemplary embodiment, first side 106 and second side 108 include substantially planar surfaces 110.

Stator 28 is configured to insert within housing 16 and couple to housing 16. First tabs 64 are configured to couple to first mounting side 106. More particularly, planar surfaces 70 of first tab 64 are configured to couple to surface 110 of mounting surface 104. In the exemplary embodiment, because first tab 64 and planar surface 70 are positioned orthogonal to axis of rotation 34 and first side 106 is positioned orthogonal to axis of rotation 34, key 42 is configured to concentrically align the plurality of laminations 46 around axis of rotation 34 and to couple planar surface 70 to mounting surface 110 to position planar surface 70 orthogonal to axis of rotation 34 to squarely set stator 28 within housing 16 in a desired and axial alignment within housing 16. Moreover, rotor 20 is configured to insert within stator 28 and couple to stator 28. Since laminations 46 are concentrically aligned around axis of rotation 34, stator 28 is configured to receive rotor 20 and set rotor 20 in a desired radial and axial alignment within housing 16. The setting of rotor 20 within stator 28 provides free rotation of rotor, preventing excessive eccentricity in an annular air gap between rotor 20 and stator 28 and preventing excessive axial rotor thrust.

FIG. 6 illustrates an exemplary flowchart 602 illustrating a method 600 of assembling a stator, for example stator 28 (shown in FIG. 3). The stator includes a plurality of laminations and a plurality of keys, such as, for example, laminations 46 and key 42 (shown in FIG. 2). In the exemplary method 600, the laminations include a first lamination, a second lamination and intermediate laminations located between the first and second laminations, for example first lamination 50 (shown in FIG. 2), second lamination 52 (shown in FIG. 2) and intermediate laminations 54 (shown in FIG. 2). Moreover, each lamination includes a slot, for example slot 60 (shown in FIG. 2). Method 600 includes stacking and aligning 604 the plurality of laminations to stabilize the plurality of laminations around axis of rotation, for example axis of rotation 34 (shown in FIG. 5).

Method 600 further includes insulating 606 the plurality of laminations. In the exemplary embodiment, insulating the laminations includes coupling insulation, for example insulation 48 (shown in FIG. 2), to the laminations. In the exemplary embodiment, insulating the laminations includes stabilizing 608 the laminations with respect to each other. After insulating the laminations, method 600 includes injecting 610 windings, for example windings 32 (shown in FIG. 1) into teeth, for example teeth 30 (shown in FIG. 1), wherein the windings are then connected. When the windings are injected into the stator, the windings can be loose at both ends of the stator. Method 600 includes shaping end turns of the windings with respect to parameters such as, but not limited to, inner surface, outer surface and height of the stator to facilitate clearing space for other mechanical components (not shown) of the electric motor.

In the exemplary embodiment, method 600 includes aligning 612 the plurality of laminations. In the exemplary embodiment, aligning the plurality of laminations includes applying a pressure to an inner surface, for example inner surface 56 (shown in FIG. 2), of each lamination, rotating the plurality of laminations and reapplying pressure to the laminations. In one embodiment, pressure is applied by a turn-key apparatus (not shown) or a draw-bar apparatus (not shown). Alternatively, aligning the plurality of laminations can include any apparatus that is configured to apply a pressure force to the inner surfaces of laminations.

While method 600 aligns the plurality of laminations, method 600 includes coupling 614 the plurality of keys to each lamination. Coupling the key includes coupling a portion, such as portion 68 (shown in FIG. 2) of the key to the slot. Method 600 includes coupling 616 a fixture, for example fixture 78 (shown in FIG. 4) to key. Moreover, method 600 includes moving 618 the key from a first position, for example first position 44 (shown in FIG. 2), to a second position, for example second position 72 (shown in FIG. 3), to facilitate coupling together the plurality of laminations.

More particularly, method 600 includes moving 620 a first tab, for example first tab 64 (shown in FIG. 2), to a first orthogonal position with respect to the axis of rotation, for example first orthogonal position 74 (shown in FIG. 3). Method 600 also includes coupling the first tab to the first lamination. Moreover, method 600 includes moving 620 a second tab, for example second tab 66 (shown in FIG. 2), to a second orthogonal position with respect to the axis of rotation, for example second orthogonal position 76 (shown in FIG. 3). Method 600 includes coupling the second tab to the second lamination. While moving the key from the first position to the second position, method 600 includes indexing 621 the key to facilitate forming at least one planar surface, for example planar surface 70 (shown in FIG. 5), that is orthogonal to the axis of rotation. In the exemplary method, indexing the key includes rotating the coupled laminations and the keys coupled thereto and applying a pressure, such as at least one of pressures 96 and 98 (shown in FIG. 4), to the key to facilitate forming the planar surfaces. Method 600 further includes aligning the plurality of laminations such as, for example, applying a pressure to the inner surfaces, for example inner surfaces 56 (shown in FIG. 2) of each lamination. Applying the pressure to the inner surfaces includes concentrically aligning the laminations around an axis of rotation, for example axis of rotation 34 (shown in FIG. 5), of the motor. In the exemplary embodiment, coupling the first tab, the second tab and portions to laminations includes coupling the laminations together free from a weld. Alternatively, method 600 can include welding the laminations together. Further, method 600 includes varnishing stator. In the exemplary embodiment, varnishing the stator includes coating and saturating the stator with a bonding varnish, such as, an epoxy.

In the exemplary embodiment, method 600 includes inserting 624 the coupled laminations into a housing, for example housing 16 (shown in FIG. 5). More particularly, method 600 includes coupling 624 the planar surface to the housing. Further, method 600 includes aligning 628 a rotor, for example rotor 20 (shown in FIG. 5), within the coupled plurality of laminations of the stator.

A technical effect of the systems and methods described herein includes at least one of: a method of assembling an electrical machine by coupling a key to the plurality of laminations; moving the key from a first position to a second position to facilitate coupling together the plurality of laminations; a stator having a key coupled to a plurality of laminations, the key including a first tab coupled to a first lamination, a second tab coupled to a second lamination and a portion coupled to intermediate laminations.

The exemplary embodiments described herein facilitate forming a stator of a motor and setting proper radial and axial alignment between the motor components. More particularly, the embodiments described herein facilitate folding tabs of the key to form planar points on the face of the stator that are square from end to end and perpendicular to the axis of rotation and/or bore of the stator to facilitate providing free rotation of the rotor, preventing excessive eccentricity in an annular air gap between the rotor and the stator and preventing excessive axial rotor thrust. Moreover, the embodiments described herein facilitate providing a mounting surface for the stator and/or rotor which minimizes or eliminates interference and/or misalignment of the rotor.

Exemplary embodiments of an electrical machine and methods for assembling the electrical machine are described above in detail. The size ranges disclosed herein include all the sub-ranges therebetween. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

While the embodiments described herein are described with respect to motors in which a stator surrounds a permanent magnet rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a stator for an electrical machine having an axis of rotation, said method comprising:
   aligning a plurality of laminations wherein each lamination includes a slot;
   coupling a plurality of keys to the plurality of laminations;
   coupling a fixture to the plurality of keys;
   utilizing the fixture to move a first tab and a second tab of each key of the plurality of keys from a first position to a second position to facilitate coupling together the plurality of laminations, wherein the first tab and the second tab extend beyond opposing axial end surfaces of the plurality of laminations in at least the first position when the stator is in an operational configuration; and
   indexing the plurality of keys to facilitate forming at least one planar surface that is positioned orthogonal to the axis of rotation, wherein the planar surface includes an axially outer surface of the plurality of keys.

2. The method of claim 1, wherein utilizing the fixture to move a first tab and a second tab of each key comprises coupling the first tab of the key to a first lamination of the plurality of laminations and coupling the second tab of the key to a second lamination of the plurality of laminations.

3. The method of claim 1, wherein s utilizing the fixture to move a first tab and a second tab of each key comprises moving the first tab of each key to a first orthogonal position with respect to the axis of rotation and the second tab of each key to a second orthogonal position with respect to the axis of rotation.

4. The method of claim 1, further comprising rotating the plurality of laminations and re-indexing the plurality of keys to facilitate positioning the at least one planar surface orthogonal to the axis of rotation.

5. The method of claim 1, wherein indexing the plurality of keys comprises rotating the coupled laminations and applying a pressure to the plurality of keys.

6. The method of claim 1, further wherein aligning the plurality of laminations comprises applying a pressure to the plurality of laminations and rotating the plurality of laminations and re-applying a pressure to the plurality of laminations.

7. The method of claim 1, further comprising coupling the planar surface to a housing.

8. The method of claim 1, wherein coupling a fixture to the plurality of laminations comprises coupling the plurality of laminations and the plurality of keys between a first member of the fixture and a second member of the fixture.

9. The method of claim 8, wherein coupling a fixture to the plurality of laminations comprises:
   coupling the first tab of each key of the plurality of keys to a respective first slot formed in the first member; and
   coupling the second tab of each key of the plurality of keys to a respective second slot formed in the second member.

10. The method of claim 1, wherein utilizing the fixture to move a first tab and a second tab of each key comprises applying pressure to at least one of the first tab and the second tab with a press member of the fixture to facilitate moving the at least one of the first tab and the second tab from the first position to the second position.

11. The method of claim 1, further comprising:
   inserting the plurality of laminations and the plurality of keys coupled thereto into a housing; and
   coupling the planar surface to a mounting surface of the housing such that the plurality of keys concentrically align the plurality of laminations about the axis of rotation.

\* \* \* \* \*